United States Patent
Heap

[19]

[11] Patent Number: 6,113,120
[45] Date of Patent: *Sep. 5, 2000

[54] VEHICLE SUSPENSION

[75] Inventor: Kenneth J Heap, Coventry, United Kingdom

[73] Assignee: Jaguar Cars Limited, Coventry, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/785,634

[22] Filed: Jan. 17, 1997

[30] Foreign Application Priority Data

Jan. 19, 1996 [GB] United Kingdom .................. 9601104

[51] Int. Cl.$^7$ ....................................................... B60G 3/99
[52] U.S. Cl. ......................... 280/124.135; 280/124.125; 280/124.171
[58] Field of Search ..................... 280/124.102, 124.109, 280/124.125, 124.126, 124.129, 124.13, 124.131, 124.135, 124.134, 124.136, 124.142, 124.141, 124.17, 124.171, 93.502, 93.508, 93.509, 93.51, 93.511, 93.512

[56] References Cited

U.S. PATENT DOCUMENTS

| | | | |
|---|---|---|---|
| 959,298 | 5/1910 | Bowers | 280/124.126 |
| 1,783,614 | 12/1930 | Griswold | 280/93.512 |
| 2,167,984 | 8/1939 | Leighton | 280/93.512 |
| 2,383,101 | 8/1945 | Woolson et al. . | |
| 2,501,796 | 3/1950 | Tucker | 280/124.171 |
| 2,886,312 | 5/1959 | Freiermuth | 280/124.141 |
| 2,895,741 | 7/1959 | Mineck . | |
| 2,971,770 | 2/1961 | Wagner | 280/124.134 |
| 3,073,617 | 1/1963 | Schultz | 280/124.142 |
| 5,037,127 | 8/1991 | Lin | 280/93.512 |

FOREIGN PATENT DOCUMENTS

| | | |
|---|---|---|
| 253 384 A2 | 7/1987 | European Pat. Off. . |
| 0 312 998 A1 | 4/1989 | European Pat. Off. . |
| 441 228 A1 | 1/1991 | European Pat. Off. . |
| 0 412 322 A1 | 2/1991 | European Pat. Off. . |
| 454 994 A1 | 6/1991 | European Pat. Off. . |
| 0 437 255 A2 | 7/1991 | European Pat. Off. . |
| 0 489 638 A1 | 6/1992 | European Pat. Off. . |
| 2 682 325 | 4/1993 | France . |
| 33 03 551 A1 | 8/1994 | Germany . |
| 195 24 106 A1 | 1/1996 | Germany . |
| 1193795 | 6/1970 | United Kingdom . |
| 2 243 348 | 3/1991 | United Kingdom . |

*Primary Examiner*—Eric Culbreth
*Attorney, Agent, or Firm*—Gregory P. Brown

[57] ABSTRACT

A vehicle suspension has a hub carrier (12) to which a wheel of a vehicle may be rotatably mounted, the hub carrier is connected to a chassis or sub-frame (14) of the vehicle, by means of a pair of vertically separated upper and lower suspension arms (16,18) being pivotally connected at one end to the vehicle chassis or sub-frame and at the other end to the hub carrier. The hub carrier has an arm (40) which extends upwardly from the point of connection of the hub carrier to the upper suspension arm, to an upper end (42) which is aligned substantially vertically above the load application point between the wheel and the ground, the upper end of said arm being connected to a spring (60).

1 Claim, 2 Drawing Sheets

VEHICLE SUSPENSION

FIELD OF THE INVENTION

The present invention relates to vehicle suspensions and in particular to vehicle suspensions in which a hub carrier for a wheel of the vehicle is articulated by a pair of wishbones.

DISCLOSURE INFORMATION

In double wishbone suspensions used hitherto, suspension loads are transmitted through the wishbones and via spring and damper units to the vehicle chassis. Such suspensions use ball joints which are required to transmit the wheel load through the articulating system to the spring/damper unit. Commercially available ball joints used in suspension systems require an internal pre-load to make the ball joints durable. This pre-load generates a frictional force as a result of the prevailing coefficient of friction which exists between the internal components of the ball joint. As a result, double wishbone suspensions produced hitherto, exhibit significant friction levels which lead to a reduction in the ride refinement of road vehicles. This effect is particularly serious in luxury and sports cars since the ride and handling performance is compromised to an unacceptable degree.

The present invention provides a vehicle suspension in which suspension loads are substantially isolated from the wishbones so that the ball joints may be replaced by rolling element bearings which reduce the friction levels significantly with a consequent improvement in ride refinement and handling performance.

SUMMARY OF THE INVENTION

In accordance with one aspect of the present invention, a vehicle suspension comprises a hub carrier to which a wheel of the vehicle may be rotatably mounted, the hub carrier being connected to a chassis or sub-frame of a vehicle by a pair of vertically separated upper and lower suspension arms, each suspension arm being pivotally connected at one end to the vehicle chassis or sub-frame and at the other end to the hub carrier, the hub carrier having an arm which extends upwardly from the point of connection of the upper suspension arm, to an upper end which is aligned substantially vertically above the load application point between a wheel mounted on the hub carrier and the ground, the upper end of said arm being connected to a spring.

Preferably the pivotal connections between the suspension arms and the hub carrier, the suspension arms and the vehicle chassis or sub-frame and/or the arm of the hub carrier and the spring are provided by rolling element bearings.

With the suspension system disclosed above, substantially all the suspension loads are transmitted vertically to the spring. As a result, only small lateral loads are applied through the suspension arms. The use of rolling element bearings, such as roller, ball, taper or needle bearings, in place of ball joints significantly reduces the friction with a consequent improvement in ride and performance of the suspension. The redirecting of the suspension loads will also allow the use of smaller and lighter suspension arms, with a resulting saving in cost and weight.

The suspension according to the present invention is particularly suitable for use on the front, steered wheels of the vehicle. In order to permit steering of the wheels, a steering knuckle which defines a stub axle is preferably attached to the hub carrier by rolling element bearings, which permit rotation of the steering knuckle about an appropriate king pin angle.

BRIEF DESCRIPTION OF THE DRAWINGS

Various embodiments of the invention are now described, by way of example only, with reference to the accompanying drawings, in which.

DETAILED DESCRIPTION OF PREFERRED EMBODIMENTS

Figure 1:
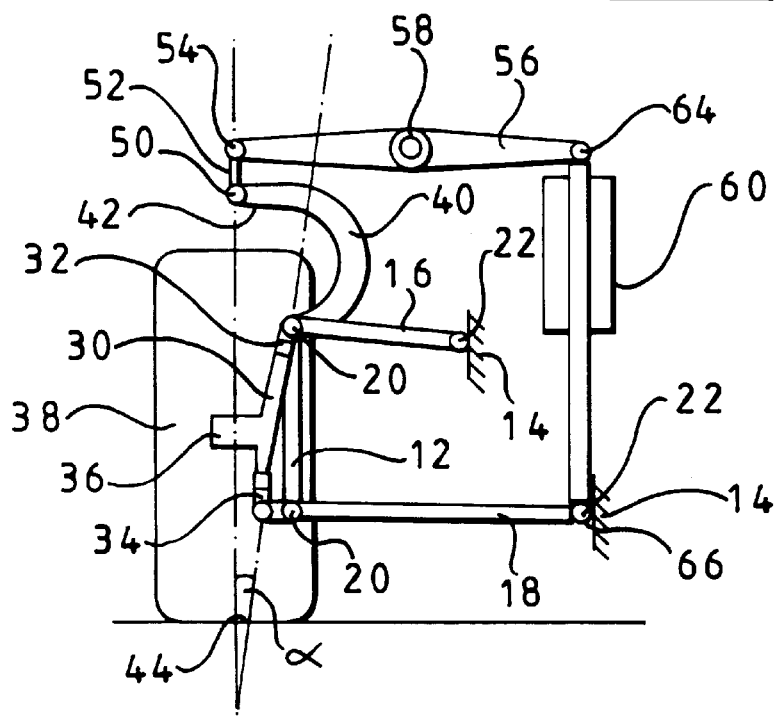
FIG. 1 is a front view side of a vehicle suspension in accordance with the present invention.

A steering knuckle 30 is mounted on the hub carrier 12 by rolling element bearings 32, 34, for rotation about an axis which is inclined at a king pin angle . A steering knuckle 30 defines a stub axle 36 upon which a wheel 38 may be rotatably mounted in conventional manner. The steering knuckle 30 also has an arm (not shown) by which it may be connected to a steering rack, in conventional manner.

The hub carrier 12 has an arcuate arm 40 which extends upwardly from the portion of the hub carrier 12 to which the upper suspension arm 16 is connected, the upper end 42 of the arm 40 being substantially aligned vertically with the wheel contact point 44 between the wheel 38 and the ground.

The upper end 42 of the arm 40 is connected by a roller bearing 50 to a link 52, the other end of link 52 being pivotally connected by a roller bearing 54 to a horizontally disposed rocker arm 56. The arm 56 is pivoted intermediate of its ends to the vehicle chassis or sub-frame 14 by roller bearing 58. A helical spring/damper unit 60 of conventional construction is connected between the end of arm 56 remote from link 52 and the vehicle sub-frame 14 by roller bearings 64 and 66.

With the suspension assembly described above, the suspension loads are transmitted vertically by the hub carrier 12 and link 52, to the rocker arm 56 and via the rocker arm 56 to the spring/damper unit 60. As a consequence, lateral loading of the suspension arms 16 and 18 is significantly reduced. The use of low friction roller bearing/bearings throughout the suspension, will significantly improve the ride and handling performance of the suspension. If required, rolling bearing elements which will permit a small amount of conical articulation may be used.

Figure 2:
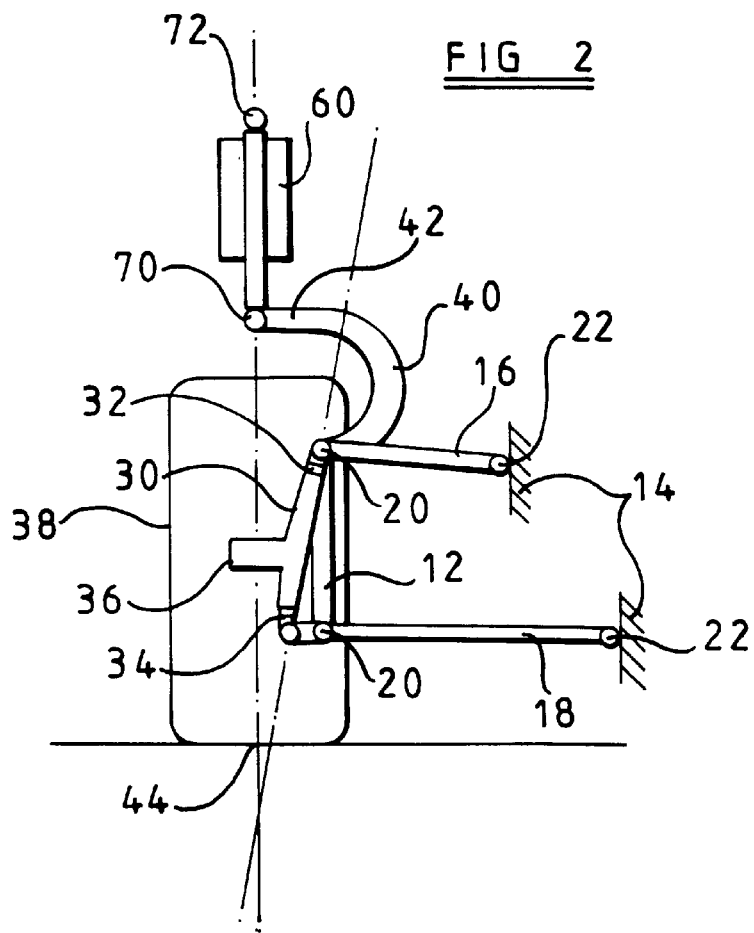
FIG. 2 is a front view of an alternative embodiment of the present invention.
Figure 3:
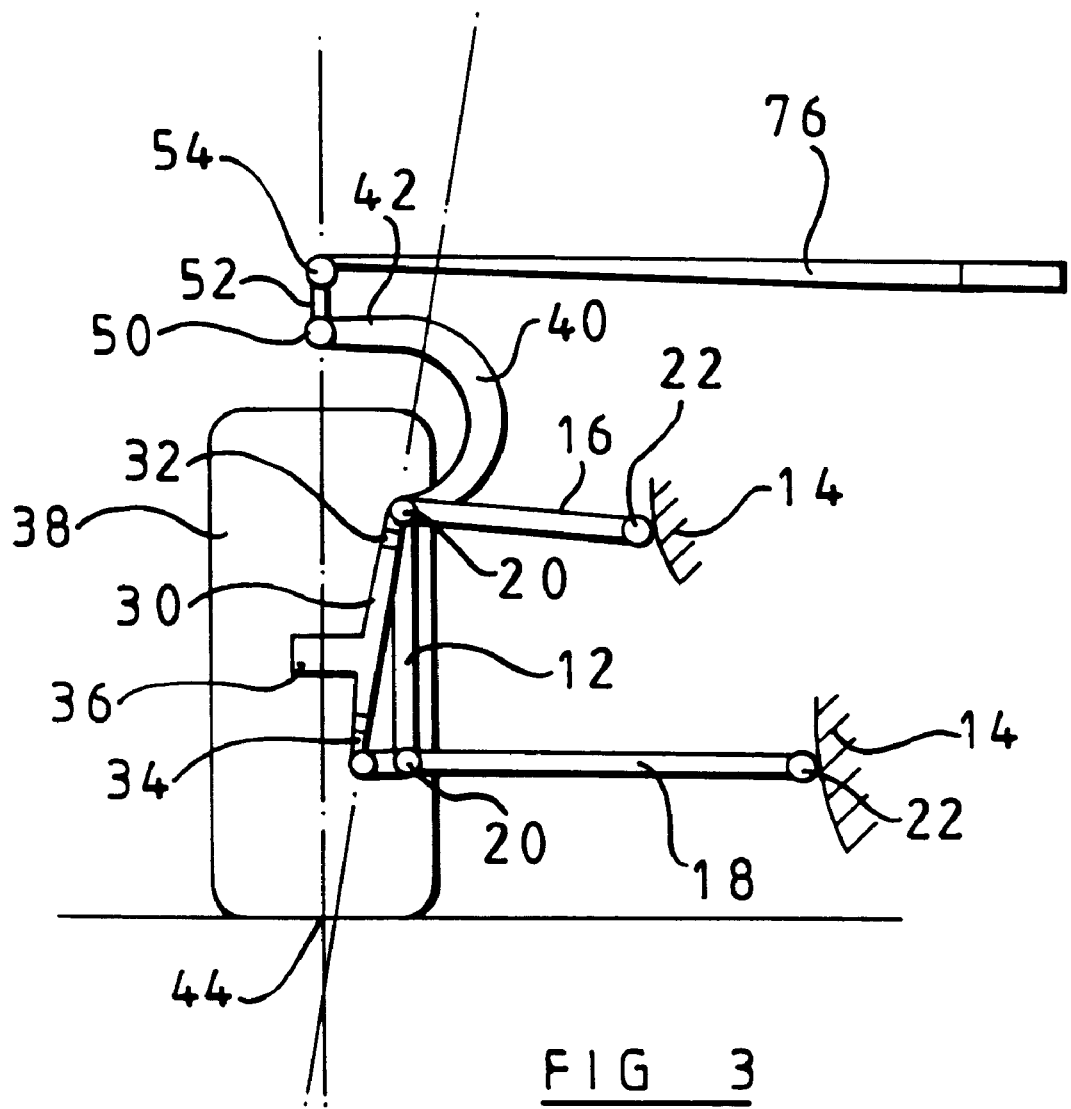
FIG. 3 is a front view of a further alternative embodiment of the present invention.

In the embodiment illustrated in FIG. 2, the upper end 42 of arm 40 is connected directly to the lower end of a vertically disposed spring/damper unit 60, by roller bearings 70, the upper end of spring/damper unit 60 being connected to the vehicle chassis or sub-frame 14 by roller bearing 72. In the alternative embodiment illustrated in FIG. 3, a link 52 connects the upper end 42 of arm 40 to a horizontally disposed leaf spring 76.

The foregoing description presents several alternative embodiments of the present invention. Details of construction have been shown and described for purposes of illustration rather than limitation. For instance, the above embodiments relate to front wheel suspensions in which the wheel is steerable, the present invention is equally appli cable to rear suspensions of the vehicle, the stub axle for rotatably supporting the vehicle wheel being secured directly to the hub carrier. Further modifications and alterations of the invention will no doubt occur to those skilled in the art that will come within the scope and spirit of the following claims.

What is claimed is:

1. A vehicle suspension for use in a motor vehicle, said suspension comprising:

a sub-frame;

a hub carrier to which a wheel of the vehicle may be rotatably mounted;

upper and lower suspension arms each being pivotally connected at one end to said sub-frame and at an opposite end to said hub carrier;

said pivotal connections between said upper and lower suspension arms and said hub carrier including rolling element bearings having an axis of rotation aligned substantially parallel to a longitudinal axis of the motor vehicle;

said pivotal connections between said upper and lower suspension arms and said sub-frame including rolling element bearings having an axis of rotation aligned substantially parallel to a longitudinal axis of the motor vehicle;

said hub carrier including an arm extending upwardly from said pivotal connection between said upper suspension arm and said hub carrier to an upper end substantially vertically above a wheel contact point, said upper end of said arm being operatively connected to a spring by a rolling element bearing having an axis of rotation aligned substantially parallel to a longitudinal axis of the motor vehicle, said upper end being operative to react substantially all vertical suspension loads therethrough; and a rocker arm interposed and interconnecting said upper end of said hub carrier arm and said spring, said interconnection being by a rolling element bearing having an axis of rotation aligned substantially parallel to a longitudinal axis of the motor vehicle.

* * * * *